Jan. 13, 1959  R. H. BENNETT  2,868,176
ROTARY PLUG VALVE
Filed July 14, 1954

Robert H. Bennett
INVENTOR.

BY *[signature]*
Attorneys

2,868,176
ROTARY PLUG VALVE

Robert H. Bennett, Munster, Ind.

Application July 14, 1954, Serial No. 443,312

1 Claim. (Cl. 121—46.5)

This invention relates to a rotary plug valve and more particularly to a valve for controlling the flow of fluid to and from a plurality of conduits.

A primary object of this invention is to provide improvements in rotary plug valves whereby the plug is so shaped and configurated as to not only efficiently control the flow of a fluid with a minimum of friction loss but also to effect such efficient flow between certain of several ports provided in the valve body and effectively block certain other ports in some of its positions of operation.

An object of this invention is to provide a rotary plug valve which in one position is capable of connecting one service port to an inlet port and another service port to an outlet port.

Another object of this invention is to provide a rotary plug valve wherein the valve can be positioned in its housing to stop the flow through the inlet port and connect a plurality of service ports simultaneously to an outlet port.

A further object of this invention is to provide a rotary plug valve which when moved to a position for allowing the flow of a fluid from an inlet to a service port will not provide an obstruction to the flow of fluid through the housing.

A yet further object of this invention is to provide a rotary plug valve which is simple and efficient in construction, durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
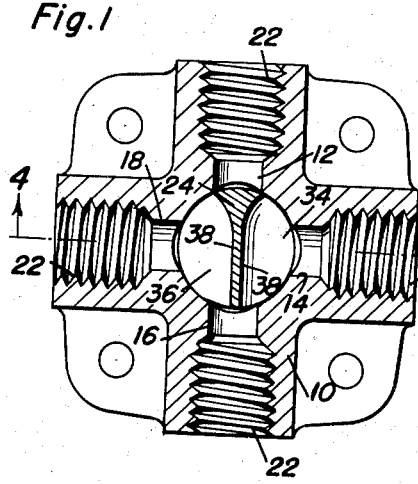
Figure 1 is a sectional view of a rotary plug valve constructed in accordance with this invention and showing the valve positioned to connect a pair of service ports to an outlet, an inlet port being shown completely closed off.

Referring now more particularly to the accompanying drawing wherein a four port valve assembly is shown for exemplary purpose, it will be seen that the improved rotary plug valve constructed in accordance with this invention includes, a housing 10 having a plurality of horizontally extending apertures 12, 14, 16 and 18 extending therethrough. The apertures 12, 14, 16 and 18 are all disposed in the same horizontal plane and the body 10 is provided with a vertically extending aperture 20 extending centrally therethrough an intersecting the inner ends of the apertures 12, 14, 16 and 18. The outer ends of the apertures 12, 14, 16 and 18 are internally threaded as at 22 for the reception of suitable conduits which can be connected to desired points.

For the purposes of clarity the conduit which is connected to aperture 12 will be considered to be connected to a suitable source of fluid under pressure and the aperture 12 will be termed as an inlet port. The aperture 16 will be considered to have a conduit connected thereto which is connected to a reservoir so that the aperture 16 may be considered an outlet port. The apertures 14 and 18 have connected thereto conduits which are connected to opposite ends of a hydraulic cylinder and will be referred to as service ports.

Figure 4:
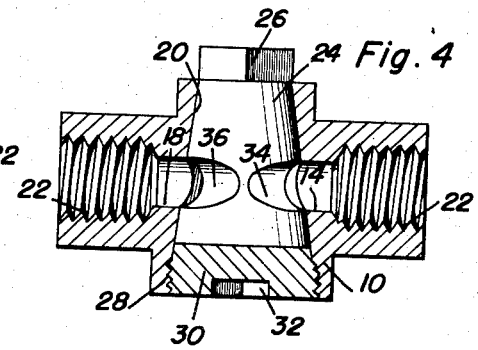
Figure 4 is a sectional view taken substantially along the section line 4—4 of Figure 1.
Figure 5:
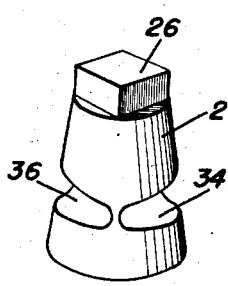
Figure 5 is a perspective view of the valve body formed integral of this invention.

The aperture 20 tapers upwardly as seen in Figure 4 and is provided with a valve body 24 positioned therein. The valve body 24 is tapered complemental to the aperture 20 and is free to rotate therein. The upper end of the valve body 24 is provided with a rectangular extension 26 which is positioned outwardly of the housing 10 whereby a convenient means is provided for rotating the valve body 24. The length of the valve body 24 is less than the length of the bore 20.

The lower end of the bore 20 is provided with an internally threaded portion 28 which threadably receives a plug 30 for sealing the same to maintain the valve body 24 in position within the housing 10. A rectangular recess 32 may be provided in the plug 30 whereby a convenient means will be provided for tightening the plug 30 in the housing 10.

The valve body 24 is provided with a pair of cut-out portions 34 and 36 which extend radially into the valve body 24 from opposite sides. As seen more clearly in Figures 1, 2 and 3 the cut-out portions 34 and 36 are spaced apart a greater distance at one end than at the other. Further, the inner walls of the cut-out portions 34 and 36 are concaved as at 38 to provide a smooth surface for the passage of the fluid thereover.

In the example shown, the distance between the adjacent ports 12, 14, 16 and 18 is of slightly greater distance than the diameter of the ports. The distance between the cut-out portions 34 and 36 at the end where they are spaced apart the most is equal to the distance between adjacent ports.

Figure 2:
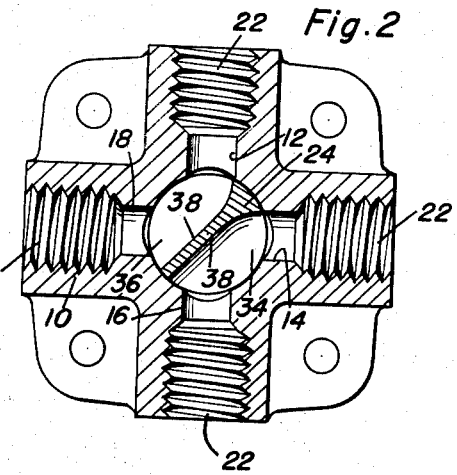
Figure 2 is a sectional view similar to Figure 1 but with the valve in position whereby the inlet port is connected to one service port and the outlet port is connected to the other service port.
Figure 3:
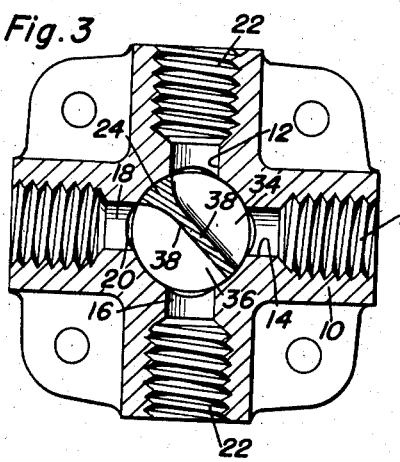
Figure 3 is a view similar to Figure 2 but with the inlet connected to the other service port and the outlet connected to the first service port.

In practical use of the device shown in the drawings, the port 12 is connected to the source of supply and the port 16 is connected to a reservoir or the like. The ports 14 and 18 are connected to the opposite ends of the cylinder as above described. Then, when it is desired to move the piston within the cylinder in one direction the valve body 24 is moved to the position as shown in Figure 2. In this case the inlet port 12 will be connected to the service port 18 while the outlet port 16 will be connected to the other service port 14. Thus, the fluid will be allowed to exhaust from the other end of the cylinder. When the piston has been moved a desired amount, the valve body 24 can then be rotated to the position shown in Figure 1 wherein the wide portion between the cut-out portions 34 and 36 will seal off the inlet port 12. Inasmuch as both ends of the cylinder will be connected to the outlet the piston therein will not move in either direction. When it is desired to move the piston in the opposite direction the inlet port 12 is connected to the service port 14 and at which time the service port 18 will be connected to the outlet 16. This will allow the fluid to flow into the other end of the cylinder while exhausting from the first end.

Inasmuch as the wide portion of the valve body is equal to the spacing between the adjacent ports when the inlet is connected to one of the ports the same will not be obstructed by a portion of the valve body.

It is to be understood that the invention is not limited to the exact construction shown, particularly in regards to the number of ports with which the valve body 24 is associated. That is, the particular configuration of the valve body 24, as shown, can be used with other and different port arrangements, both as to the positioning of the ports and the number thereof. For example, the valve body 24 may be used effectively with a three port arrangement or others, as desired. The primary advantage attained by the use of this invention accrues from the particular shape of the valve body 24 rather than any specific arrangement of porting. In this regard, it will be noted that the cut-away portions 34 and 36 of the valve body present, as above described, a thicker or wider portion, as designated by the reference character T. The edges of this thickened port of the valve body coincide with the inner edges of the various ports and merge smoothly therewith to minimize frictional losses and also to provide a wiping action on the bore or aperture 20 of the valve housing so as to maintain the valve clean and free from foreign material which might otherwise impair not only the efficiency of the valve as regards its flow characteristics but also detrimentally effect its ease of manipulation and cause scoring or galling which would ultimately destroy the valve. This is extremely important particularly in automatic control valves wherein the valve, for optimum sensitivity, must work freely without binding or sticking.

The very nature of the cutaway portions 34 and 36 result in a progressively increasing throttling action on the fluid flowing therethrough as the valve body or plug is rotated. This is also extremely important in automatic control operation and eliminates "hunting" and imparts a high degree of sensitivity to the valve.

In fact, the valve body herein shown and described is intended primarily for automatic operation and in this respect, the high degree of sensitivity thereof will be seen to be very beneficial inasmuch as the valve will repeatedly assume substantially identical positions in response to similar settings of the index or control, that is, it will operate in response to a control in a very consistent manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A valve comprising a housing, a rotary tapered valve plug in the housing, said housing being provided with a plurality of coplanar ports therein of like diameter radiating from said valve plug and spaced apart a distance slightly greater than the diameter of said ports and comprising a pair of service ports at diametrically opposite sides of the valve plug, and a pair of inlet and outlet ports, respectively, intermediate the service ports, said valve plug having a pair of transverse grooves in opposite sides thereof coplanar with said ports and transversely concave for free flow therethrough and converging relatively to form a transverse partition between the grooves having a widened portion at one side of the valve plug of substantially the same diameter as the distance between two adjacent ports and slightly wider than the diameter of each port, said grooves being of a length to communicate any two adjacent ports, said valve plug having different angular positions in which said grooves communicate either service port with either the inlet or outlet port and angular positions in which said widened portion closes any one port while said grooves communicate the other three ports with the partition aligned with the closed port and said widened portion spaced from each port adjacent the closed port so that said plug valve is positionable to completely open the closed port without overlapping either of the two adjacent ports.

References Cited in the file of this patent

UNITED STATES PATENTS

| | | |
|---|---|---|
| 1,525,839 | Webb | Feb. 10, 1925 |
| 2,229,931 | Parker | Jan. 28, 1941 |
| 2,252,660 | Kulikoff | Aug. 12, 1941 |
| 2,331,133 | Nardone | Oct. 5, 1943 |
| 2,388,890 | Whitted | Nov. 13, 1945 |
| 2,737,976 | Clack | Mar. 13, 1956 |

FOREIGN PATENTS

| | | |
|---|---|---|
| 91,447 | Sweden | 1938 |
| 117,314 | Sweden | 1946 |
| 985,705 | France | 1951 |